US010528851B2

United States Patent
Zhu et al.

(10) Patent No.: US 10,528,851 B2
(45) Date of Patent: Jan. 7, 2020

(54) SYSTEM AND METHOD FOR DRIVABLE ROAD SURFACE REPRESENTATION GENERATION USING MULTIMODAL SENSOR DATA

(71) Applicant: TuSimple, San Diego, CA (US)

(72) Inventors: Ligeng Zhu, Vancouver (CA); Panqu Wang, San Diego, CA (US); Pengfei Chen, San Diego, CA (US)

(73) Assignee: TUSIMPLE, San Diego, CA (US)

( * ) Notice: Subject to any disclaimer, the term of this patent is extended or adjusted under 35 U.S.C. 154(b) by 80 days.

(21) Appl. No.: 15/822,467

(22) Filed: Nov. 27, 2017

(65) Prior Publication Data
US 2019/0164018 A1 May 30, 2019

(51) Int. Cl.
G06K 9/00 (2006.01)
G06K 9/62 (2006.01)
G06K 9/44 (2006.01)
G06K 9/40 (2006.01)
G05D 1/02 (2006.01)
(Continued)

(52) U.S. Cl.
CPC ......... *G06K 9/6289* (2013.01); *G05D 1/0248* (2013.01); *G06K 9/00798* (2013.01); *G06K 9/40* (2013.01); *G06K 9/44* (2013.01); *G06T 5/30* (2013.01); *G08G 1/167* (2013.01); *G05D 2201/0213* (2013.01); *G06K 9/209* (2013.01); *G06T 2207/10028* (2013.01); *G06T 2207/20024* (2013.01); *G06T 2207/20081* (2013.01);
(Continued)

(58) Field of Classification Search
CPC .................. G06K 9/00798; G06T 2207/10028
See application file for complete search history.

(56) References Cited

U.S. PATENT DOCUMENTS 6,777,904 B1  8/2004  Degner
7,103,460 B1  9/2006  Breed
(Continued)

FOREIGN PATENT DOCUMENTS

EP  1754179 A1  2/2007
EP  2448251 A2  5/2012
(Continued)

OTHER PUBLICATIONS

Jimenez. "Improving the Lane Reference Detection for Autonomous Road Vehicle Control" Hindawi, vol. 2016, Article ID 9497524, p. 13 (Year: 2016).*

(Continued)

*Primary Examiner* — Oneal R Mistry

(74) *Attorney, Agent, or Firm* — Jim H. Salter; Inventive Law Inc.

(57) ABSTRACT

A system and method for drivable road surface representation generation using multimodal sensor data are disclosed. A particular embodiment includes: receiving image data from an image generating device mounted on a vehicle and receiving three dimensional (3D) point cloud data from a distance measuring device mounted on the vehicle; projecting the 3D point cloud data onto the 2D image data to produce mapped image and point cloud data; performing post-processing operations on the mapped image and point cloud data; and performing a smoothing operation on the processed mapped image and point cloud data to produce a drivable road surface map or representation.

20 Claims, 10 Drawing Sheets

(51) Int. Cl.
  *G08G 1/16* (2006.01)
  *G06T 5/30* (2006.01)
  *G06K 9/20* (2006.01)

(52) U.S. Cl.
  CPC .............. *G06T 2207/20084* (2013.01); *G06T 2207/20221* (2013.01); *G06T 2207/30256* (2013.01)

(56) References Cited

U.S. PATENT DOCUMENTS

| | | | |
|---|---|---|---|
| 7,689,559 B2 | 3/2010 | Canright |
| 7,783,403 B2 | 8/2010 | Breed |
| 7,844,595 B2 | 11/2010 | Canright |
| 8,041,111 B1 | 10/2011 | Wilensky |
| 8,064,643 B2 | 11/2011 | Stein |
| 8,082,101 B2 | 12/2011 | Stein |
| 8,164,628 B2 | 4/2012 | Stein |
| 8,175,376 B2 | 5/2012 | Marchesotti |
| 8,271,871 B2 | 9/2012 | Marchesotti |
| 8,378,851 B2 | 2/2013 | Stein |
| 8,392,117 B2 | 3/2013 | Dolgov |
| 8,401,292 B2 | 3/2013 | Park |
| 8,412,449 B2 | 4/2013 | Trepagnier |
| 8,478,072 B2 | 7/2013 | Aisaka |
| 8,553,088 B2 | 10/2013 | Stein |
| 8,788,134 B1 | 7/2014 | Litkouhi |
| 8,908,041 B2 | 12/2014 | Stein |
| 8,917,169 B2 | 12/2014 | Schofield |
| 8,963,913 B2 | 2/2015 | Baek |
| 8,965,621 B1 | 2/2015 | Urmson |
| 8,981,966 B2 | 3/2015 | Stein |
| 8,993,951 B2 | 3/2015 | Schofield |
| 9,002,632 B1 | 4/2015 | Emigh |
| 9,008,369 B2 | 4/2015 | Schofield |
| 9,025,880 B2 | 5/2015 | Perazzi |
| 9,042,648 B2 | 5/2015 | Wang |
| 9,111,444 B2 | 8/2015 | Kaganovich |
| 9,117,133 B2 | 8/2015 | Barnes |
| 9,118,816 B2 | 8/2015 | Stein |
| 9,120,485 B1 | 9/2015 | Dolgov |
| 9,122,954 B2 | 9/2015 | Srebnik |
| 9,134,402 B2 | 9/2015 | Sebastian |
| 9,145,116 B2 | 9/2015 | Clarke |
| 9,147,255 B1 | 9/2015 | Zhang |
| 9,156,473 B2 | 10/2015 | Clarke |
| 9,176,006 B2 | 11/2015 | Stein |
| 9,179,072 B2 | 11/2015 | Stein |
| 9,183,447 B1 | 11/2015 | Gdalyahu |
| 9,185,360 B2 | 11/2015 | Stein |
| 9,191,634 B2 | 11/2015 | Schofield |
| 9,233,659 B2 | 1/2016 | Rosenbaum |
| 9,233,688 B2 | 1/2016 | Clarke |
| 9,248,832 B2 | 2/2016 | Huberman |
| 9,248,835 B2 | 2/2016 | Tanzmeister |
| 9,251,708 B2 | 2/2016 | Rosenbaum |
| 9,277,132 B2 | 3/2016 | Berberian |
| 9,280,711 B2 | 3/2016 | Stein |
| 9,286,522 B2 | 3/2016 | Stein |
| 9,297,641 B2 | 3/2016 | Stein |
| 9,299,004 B2 | 3/2016 | Lin |
| 9,315,192 B1 | 4/2016 | Zhu |
| 9,317,033 B2 | 4/2016 | Ibanez-Guzman |
| 9,317,776 B1 | 4/2016 | Honda |
| 9,330,334 B2 | 5/2016 | Lin |
| 9,342,074 B2 | 5/2016 | Dolgov |
| 9,355,635 B2 | 5/2016 | Gao |
| 9,365,214 B2 | 6/2016 | Ben Shalom |
| 9,399,397 B2 | 7/2016 | Mizutani |
| 9,428,192 B2 | 8/2016 | Schofield |
| 9,436,880 B2 | 9/2016 | Bos |
| 9,438,878 B2 | 9/2016 | Niebla |
| 9,443,163 B2 | 9/2016 | Springer |
| 9,446,765 B2 | 9/2016 | Ben Shalom |
| 9,459,515 B2 | 10/2016 | Stein |
| 9,466,006 B2 | 10/2016 | Duan |
| 9,476,970 B1 | 10/2016 | Fairfield |
| 9,490,064 B2 | 11/2016 | Hirosawa |
| 9,531,966 B2 | 12/2016 | Stein |
| 9,535,423 B1 | 1/2017 | Debreczeni |
| 9,555,803 B2 | 1/2017 | Pawlicki |
| 9,568,915 B1 | 2/2017 | Berntorp |
| 9,587,952 B1 | 3/2017 | Slusar |
| 9,720,418 B2 | 8/2017 | Stenneth |
| 9,723,097 B2 | 8/2017 | Harris |
| 9,723,099 B2 | 8/2017 | Chen |
| 9,738,280 B2 | 8/2017 | Rayes |
| 9,746,550 B2 | 8/2017 | Nath |
| 9,953,236 B1 | 4/2018 | Huang |
| 10,067,509 B1 | 9/2018 | Wang |
| 10,147,193 B2 | 12/2018 | Huang |
| 2007/0230792 A1 | 10/2007 | Shashua |
| 2008/0249667 A1 | 10/2008 | Horvitz |
| 2009/0040054 A1 | 2/2009 | Wang |
| 2010/0049397 A1 | 2/2010 | Lin |
| 2010/0226564 A1 | 9/2010 | Marchesotti |
| 2010/0281361 A1 | 11/2010 | Marchesotti |
| 2011/0206282 A1 | 8/2011 | Aisaka |
| 2012/0105639 A1 | 5/2012 | Stein |
| 2012/0140076 A1 | 6/2012 | Rosenbaum |
| 2012/0274629 A1 | 11/2012 | Baek |
| 2014/0145516 A1 | 5/2014 | Hirosawa |
| 2014/0198184 A1 | 7/2014 | Stein |
| 2015/0062304 A1 | 3/2015 | Stein |
| 2015/0353082 A1 | 12/2015 | Lee |
| 2016/0037064 A1 | 2/2016 | Stein |
| 2016/0094774 A1 | 3/2016 | Li |
| 2016/0129907 A1 | 5/2016 | Kim |
| 2016/0165157 A1 | 6/2016 | Stein |
| 2016/0210528 A1 | 7/2016 | Duan |
| 2016/0321381 A1 | 11/2016 | English |
| 2016/0375907 A1 | 12/2016 | Erban |
| 2017/0039436 A1* | 2/2017 | Chen .................. G06K 9/00798 |
| 2018/0259970 A1 | 9/2018 | Wang |
| 2018/0260956 A1 | 9/2018 | Huang |
| 2019/0035099 A1* | 1/2019 | Ebrahimi Afrouzi ... G06T 7/344 |
| 2019/0128677 A1* | 5/2019 | Naman ................. G01O 21/20 |
| 2019/0156128 A1* | 5/2019 | Zhang ................. G05D 1/0212 |

FOREIGN PATENT DOCUMENTS

| | | | |
|---|---|---|---|
| EP | 2463843 A2 | 6/2012 |
| EP | 2463843 A3 | 7/2013 |
| EP | 2761249 A1 | 8/2014 |
| EP | 2463843 B1 | 7/2015 |
| EP | 2448251 A3 | 10/2015 |
| EP | 2946336 A2 | 11/2015 |
| EP | 2993654 A1 | 3/2016 |
| EP | 3081419 A1 | 10/2016 |
| WO | WO/2005/098739 A1 | 10/2005 |
| WO | WO/2005/098751 A1 | 10/2005 |
| WO | WO/2005/098782 | 10/2005 |
| WO | WO/2010/109419 A1 | 9/2010 |
| WO | WO/2013/045612 | 4/2013 |
| WO | WO/2014/111814 A2 | 7/2014 |
| WO | WO/2014/111814 A3 | 7/2014 |
| WO | WO/2014/201324 | 12/2014 |
| WO | WO/2015/083009 | 6/2015 |
| WO | WO/2015/103159 A1 | 7/2015 |
| WO | WO/2015/125022 | 8/2015 |
| WO | WO/2015/186002 A2 | 12/2015 |
| WO | WO/2015/186002 A3 | 12/2015 |
| WO | WO/2016/135736 | 9/2016 |
| WO | WO/2017/013875 A1 | 1/2017 |

OTHER PUBLICATIONS

Chen et al (U.S. Patent Pub. No. 2017/0039436, hereafter referred to as Chen) in view of Tan (NPL "Robust Curb Detection with Fusion of 3D Lidar and Camera Data" Sensors ISSN 1424-8220, 2014 pp. 1-27) (Year: 2014).*

Hou, Xiaodi and Zhang, Liqing, "Saliency Detection: A Spectral

(56) References Cited

OTHER PUBLICATIONS

Residual Approach", Computer Vision and Pattern Recognition, CVPR'07—IEEE Conference, pp. 1-8, 2007.
Hou, Xiaodi and Harel, Jonathan and Koch, Christof, "Image Signature: Highlighting Sparse Salient Regions", IEEE Transactions on Pattern Analysis and Machine Intelligence, vol. 34, No. 1, pp. 194-201, 2012.
Li, Yanghao and Wang, Naiyan and Liu, Jiaying and Hou, Xiaodi, "Factorized Bilinear Models for Image Recognition", arXiv preprint arXiv:1611.05709, 2016.
Hou, Xiaodi, "Computational Modeling and Psychophysics in Low and Mid-Level Vision", California Institute of Technology, 2014.
Spinello, Luciano, Triebel, Rudolph, Siegwart, Roland, "Multiclass Multimodal Detection and Tracking in Urban Environments", Sage Journals, vol. 29 issue: 12, pp. 1498-1515 Article first published online: Oct. 7, 2010;Issue published: Oct. 1, 2010.
Matthew Barth, Carrie Malcolm, Theodore Younglove, and Nicole Hill, "Recent Validation Efforts for a Comprehensive Modal Emissions Model", Transportation Research Record 1750, Paper No. 01-0326, College of Engineering, Center for Environmental Research and Technology, University of California, Riverside, CA 92521, date unknown.
Kyoungho Ahn, Hesham Rakha, "The Effects of Route Choice Decisions on Vehicle Energy Consumption and Emissions", Virginia Tech Transportation Institute, Blacksburg, VA 24061, date unknown.
Ramos, Sebastian, Gehrig, Stefan, Pinggera, Peter, Franke, Uwe, Rother, Carsten, "Detecting Unexpected Obstacles for Self-Driving Cars: Fusing Deep Learning and Geometric Modeling", arXiv:1612.06573v1 [cs.CV] Dec. 20, 2016.
Schroff, Florian, Dmitry Kalenichenko, James Philbin, (Google), "FaceNet: A Unified Embedding for Face Recognition and Clustering", CVPR 2015.
Dai, Jifeng, Kaiming He, Jian Sun, (Microsoft Research), "Instance-aware Semantic Segmentation via Multi-task Network Cascades", CVPR 2016.
Huval, Brody, Tao Wang, Sameep Tandon, Jeff Kiske, Will Song, Joel Pazhayampallil, Mykhaylo Andriluka, Pranav Rajpurkar, Toki Migimatsu, Royce Cheng-Yue, Fernando Mujica, Adam Coates, Andrew Y. Ng, "An Empirical Evaluation of Deep Learning on Highway Driving", arXiv:1504.01716v3 [cs.RO] Apr. 17, 2015.
Tian Li, "Proposal Free Instance Segmentation Based on Instance-aware Metric", Department of Computer Science, Cranberry-Lemon University, Pittsburgh, PA., date unknown.
Mohammad Norouzi, David J. Fleet, Ruslan Salakhutdinov, "Hamming Distance Metric Learning", Departments of Computer Science and Statistics, University of Toronto, date unknown.
Jain, Suyong Dull, Grauman, Kristen, "Active Image Segmentation Propagation", In Proceedings of the IEEE Conference on Computer Vision and Pattern Recognition (CVPR), Las Vegas, Jun. 2016.
MacAodha, Oisin, Campbell, Neill D.F., Kautz, Jan, Brostow, Gabriel J., "Hierarchical Subquery Evaluation for Active Learning on a Graph", In Proceedings of the IEEE Conference on Computer Vision and Pattern Recognition (CVPR), 2014.
Kendall, Alex, Gal, Yarin, "What Uncertainties Do We Need in Bayesian Deep Learning for Computer Vision", arXiv:1703.04977v1 [cs.Cv] Mar. 15, 2017.
Wei, Junqing, John M. Dolan, Bakhtiar Litkhouhi, "A Prediction- and Cost Function-Based Algorithm for Robust Autonomous Freeway Driving", 2010 IEEE Intelligent Vehicles Symposium, University of California, San Diego, CA, USA, Jun. 21-24, 2010.
Peter Welinder, Steve Branson, Serge Belongie, Pietro Perona, "The Multidimensional Wisdom of Crowds"; http://www.vision.caltech.edu/visipedia/papers/WelinderEtalNIPS10.pdf, 2010.
Kai Yu, Yang Zhou, Da Li, Zhang Zhang, Kaiqi Huang, "Large-scale Distributed Video Parsing and Evaluation Platform", Center for Research on Intelligent Perception and Computing, Institute of Automation, Chinese Academy of Sciences, China, arXiv:1611.09580v1 [cs.Cv] Nov. 29, 2016.

P. Guarneri, G. Rocca and M. Gobbi, "A Neural-Network-Based Model for the Dynamic Simulation of the Tire/Suspension System While Traversing Road Irregularities," in IEEE Transactions on Neural Networks, vol. 19, No. 9, pp. 1549-1563, Sep. 2008.
C. Yang, Z. Li, R. Cui and B. Xu, "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.
Stephan R. Richter, Vibhav Vineet, Stefan Roth, Vladlen Koltun, "Playing for Data: Ground Truth from Computer Games", Intel Labs, European Conference on Computer Vision (ECCV), Amsterdam, the Netherlands, 2016.
Thanos Athanasiadis, Phivos Mylonas, Yannis Avrithis, and Stefanos Kollias, "Semantic Image Segmentation and Object Labeling", IEEE Transactions on Circuits and Systems for Video Technology, vol. 17, No. 3, Mar. 2007.
Marius Cordts, Mohamed Omran, Sebastian Ramos, Timo Rehfeld, Markus Enzweiler Rodrigo Benenson, Uwe Franke, Stefan Roth, and Bernt Schiele, "The Cityscapes Dataset for Semantic Urban Scene Understanding", Proceedings of the IEEE Computer Society Conference on Computer Vision and Pattern Recognition (CVPR), Las Vegas, Nevada, 2016.
Adhiraj Somani, Nan Ye, David Hsu, and Wee Sun Lee, "DESPOT: Online POMDP Planning with Regularization", Department of Computer Science, National University of Singapore, date unknown.
Adam Paszke, Abhishek Chaurasia, Sangpil Kim, and Eugenio Culurciello. Enet: A deep neural network architecture for real-time semantic segmentation. CoRR, abs/1606.02147, 2016.
Szeliski, Richard, "Computer Vision: Algorithms and Applications" http://szeliski.org/Book/, 2010.
Hou, Xiaodi and Zhang, Liqing, "Dynamic Visual Attention: Searching for Coding Length Increments", Advances in Neural Information Processing Systems, vol. 21, pp. 681-688, 2008.
Li, Yin and Hou, Xiaodi and Koch, Christof and Rehg, James M. And Yuille, Alan L., "The Secrets of Salient Object Segmentation", Proceedings of the IEEE Conference on Computer Vision and Pattern Recognition, pp. 280-287, 2014.
Zhou, Bolei and Hou, Xiaodi and Zhang, Liqing, "A Phase Discrepancy Analysis of Object Motion", Asian Conference on Computer Vision, pp. 225-238, Springer Berlin Heidelberg, 2010.
Hou, Xiaodi and Yuille, Alan and Koch, Christof, "Boundary Detection Benchmarking: Beyond F-Measures", Computer Vision and Pattern Recognition, CVPR'13, vol. 2013, pp. 1-8, IEEE, 2013.
Hou, Xiaodi and Zhang, Liqing, "Color Conceptualization", Proceedings of the 15th ACM International Conference on Multimedia, pp. 265-268, ACM, 2007.
Hou, Xiaodi and Zhang, Liqing, "Thumbnail Generation Based on Global Saliency", Advances in Cognitive Neurodynamics, ICCN 2007, pp. 999-1003, Springer Netherlands, 2008.
Hou, Xiaodi and Yuille, Alan and Koch, Christof, "A Meta-Theory of Boundary Detection Benchmarks", arXiv preprint arXiv:1302.5985, 2013.
Li Yanghao and Wang, Naiyan and Shi, Jianping and Liu, Jiaying and Hou, Xiaodi, "Revisiting Batch Normalization for Practical Domain Adaptation", arXiv preprint arXiv:1603.04779, 2016.
Li, Yanghao and Wang, Naiyan and Liu, Jiaying and Hou, Xiaodi, "Demystifying Neural Style Transfer", arXiv preprint arXiv:1701.01036, 2017.
Hou, Xiaodi and Zhang, Liqing, "A Time-Dependent Model of Information Capacity of Visual Attention", International Conference on Neural Information Processing, pp. 127-136, Springer Berlin Heidelberg, 2006.
Wang, Panqu and Chen, Pengfei and Yuan, Ye and Liu, Ding and Huang, Zehua and Hou, Xiaodi and Cottrell, Garrison, "Understanding Convolution for Semantic Segmentation", arXiv preprint arXiv:1702.08502, 2017.
Kyoungho Ahn, Hesham Rakha, "The Effects of Route Choice Decisions on Vehicle Energy Consumption and Emissions", Virginia Tech Transportation Institute, date unknown.

\* cited by examiner

SYSTEM AND METHOD FOR DRIVABLE ROAD SURFACE REPRESENTATION GENERATION USING MULTIMODAL SENSOR DATA

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever. The following notice applies to the disclosure herein and to the drawings that form a part of this document: Copyright 2016-2017, TuSimple, All Rights Reserved.

TECHNICAL FIELD

This patent document pertains generally to tools (systems, apparatuses, methodologies, computer program products, etc.) for image processing, point cloud processing, vehicle control systems, vehicle navigation, and autonomous driving systems, and more particularly, but not by way of limitation, to a system and method for drivable road surface representation generation using multimodal sensor data.

BACKGROUND

The detection of the drivable road surface ahead is an important function for many driver assistance systems as well as for autonomous vehicles. Detection of the drivable road surface using visual information from cameras is typically used in many conventional autonomous driving systems. Usually, a camera is mounted on the front of the vehicle to capture the road images. However, the captured images may be of poor quality in various environments, weather conditions, lighting conditions, and the like. As such, conventional drivable road surface detection systems cannot perform well in many real-world driving environments.

SUMMARY

A system and method for drivable road surface representation generation using multimodal sensor data are disclosed herein. The drivable road surface representation generation system of various example embodiments can automatically generate camera-view drivable road region representations based on data from cameras or other image generation devices and data from laser light detection and ranging (LIDAR) devices. The drivable road region representations can be used to train deep convolutional neural networks (CNNs). Because training deep CNNs requires a large volume of camera-based images, which can be prohibitively expensive and slow to get human manual annotation, an automatic method is disclosed herein to generate reliable drivable road ground truth representations for the CNNs. As LIDAR is another form of sensor device that has been widely used on autonomous driving vehicles, the embodiments disclosed herein combine camera or image data with LIDAR three dimensional (3D) point cloud data as multimodal sensor data, which can be used to automatically generate a drivable road region representation.

BRIEF DESCRIPTION OF THE DRAWINGS

The various embodiments are illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

A system and method for drivable road surface representation generation using multimodal sensor data are disclosed herein. The drivable road surface representation generation system of various example embodiments can automatically generate camera-view drivable road region representations based on data from cameras or other image generation devices and data from laser light detection and ranging (LIDAR) devices. The drivable road region representations can be used to train deep convolutional neural networks (CNNs). Because training deep CNNs requires a large volume of camera-based images, which can be prohibitively expensive and slow to get human manual annotation, an automatic method is disclosed herein to generate reliable drivable road ground truth representations for the CNNs. As LIDAR is another form of sensor device that has been widely used on autonomous driving vehicles, the embodiments disclosed herein combine camera or image data with LIDAR point cloud data as multimodal sensor data, which can be used to automatically generate a drivable road region representation.

In various example embodiments described herein, a drivable road surface representation generation system and method combine multimodal sensor data from different types of sensor devices (e.g., cameras, laser light detection and ranging [LIDAR] devices, and the like) and produce accurate drivable road surface representations in a drivable road surface map. By leveraging the advantages of different types of sensors, the various example embodiments described herein can detect drivable road surfaces, which can be used as ground truth data to train deep CNNs.

Figure 1:
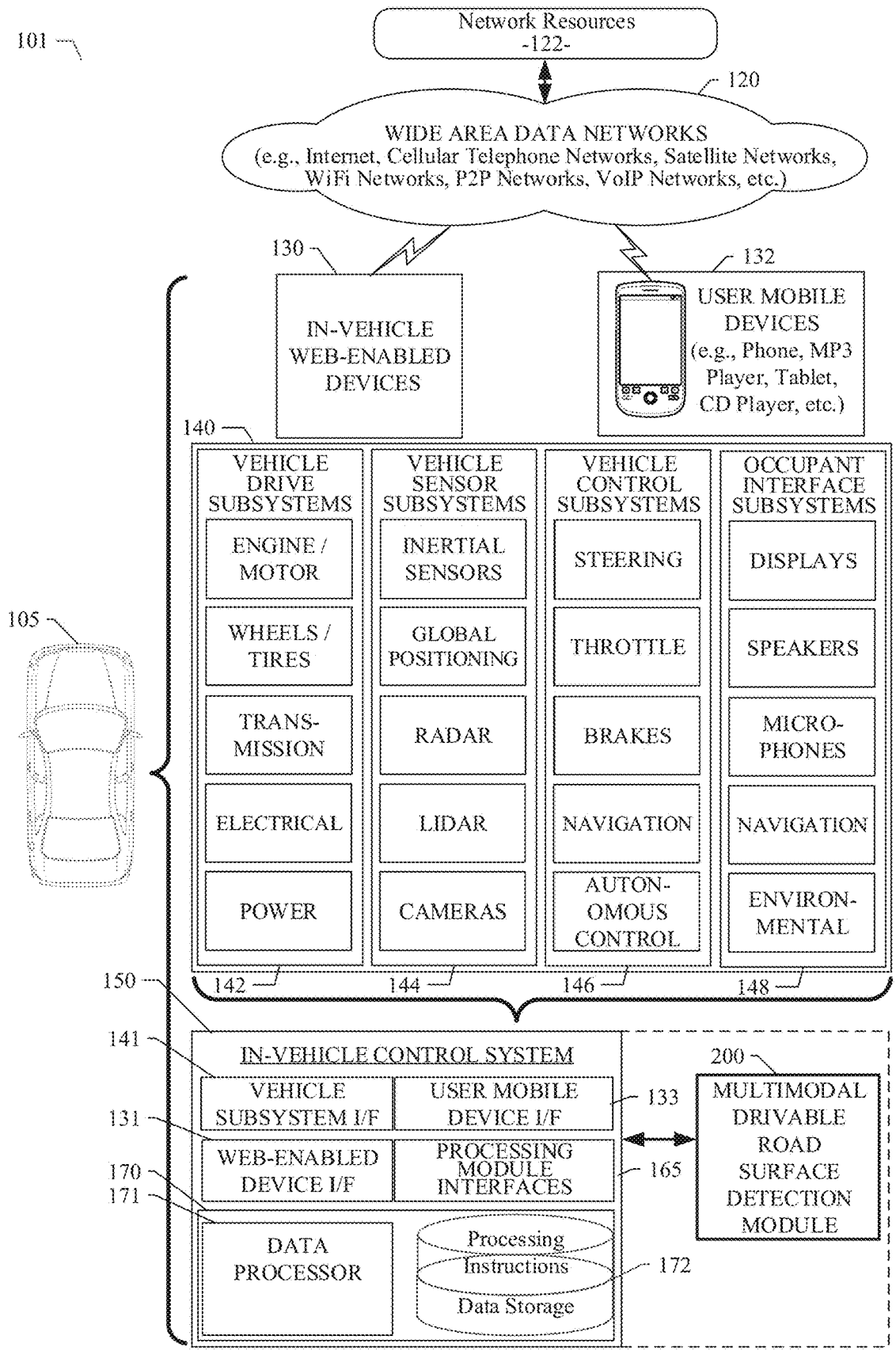
FIG. 1 illustrates a block diagram of an example ecosystem in which a multimodal drivable road surface detection module of an example embodiment can be implemented.

Referring now to FIG. 1, various example embodiments disclosed herein can be used in the context of a control system 150 in a vehicle ecosystem 101. In one example embodiment, a control system 150 with a multimodal drivable road surface detection module 200 resident in a vehicle 105 can be configured like the architecture and ecosystem 101 illustrated in FIG. 1. However, it will be apparent to those of ordinary skill in the art that the multimodal drivable road surface detection module 200 described and claimed herein can be implemented, configured, and used in a variety of other applications and systems as well.

Referring again to FIG. 1, a block diagram illustrates an example ecosystem 101 in which a control system 150 and a multimodal drivable road surface detection module 200 of an example embodiment can be implemented. These components are described in more detail below. Ecosystem 101 includes a variety of systems and components that can generate and/or deliver one or more sources of information/data and related services to the control system 150 and the multimodal drivable road surface detection module 200, which can be installed in the vehicle 105. For example, a camera installed in the vehicle 105, as one of the devices of vehicle subsystems 140, can generate image and timing data that can be received by the control system 150. The control system 150 and the multimodal drivable road surface detection module 200 executing thereon can receive this image and timing data input. As described in more detail below, the multimodal drivable road surface detection module 200 can receive the image data, receive 3D LIDAR point cloud data, process the input LIDAR point clouds, project the 3D point clouds onto the two-dimensional (2D) image data, process the input vehicle metric data (e.g., vehicle position, speed, heading etc.), perform drivable road surface detection using the multimodal sensor data, as described in more detail below, and produce a corresponding drivable road surface map. The results of the processing can be used to accurately detect and map the drivable road surfaces proximate to or ahead of the location of the autonomous vehicle 105 and to train deep CNNs for vehicle control systems. In a particular embodiment, the drivable road surface map can be used by an autonomous vehicle control subsystem, as another one of the subsystems of vehicle subsystems 140. The autonomous vehicle control subsystem, for example, can use the drivable road surface map to safely and efficiently control the vehicle 105 in a real world or simulated driving scenario while avoiding obstacles and safely controlling the vehicle.

In an example embodiment as described herein, the control system 150 can be in data communication with a plurality of vehicle subsystems 140, all of which can be resident in a user's vehicle 105. A vehicle subsystem interface 141 is provided to facilitate data communication between the control system 150 and the plurality of vehicle subsystems 140. The control system 150 can be configured to include a data processor 171 to execute the multimodal drivable road surface detection module 200 for processing image data, LIDAR data, and vehicle metric data received from one or more of the vehicle subsystems 140. The data processor 171 can be combined with a data storage device 172 as part of a computing system 170 in the control system 150. The data storage device 172 can be used to store data, processing parameters, and data processing instructions. A processing module interface 165 can be provided to facilitate data communications between the data processor 171 and the multimodal drivable road surface detection module 200. In various example embodiments, a plurality of processing modules, configured similarly to multimodal drivable road surface detection module 200, can be provided for execution by data processor 171. As shown by the dashed lines in FIG. 1, the multimodal drivable road surface detection module 200 can be integrated into the control system 150 or optionally downloaded to the control system 150.

The control system 150 can be configured to receive or transmit data from/to a wide-area network 120 and network resources 122 connected thereto. A web-enabled device 130 and/or a user mobile device 132 can be used to communicate via network 120. A web-enabled device interface 131 can be used by the control system 150 to facilitate data communication between the control system 150 and the network 120 via the web-enabled device 130. Similarly, a user mobile device interface 133 can be used by the control system 150 to facilitate data communication between the control system 150 and the network 120 via the user mobile device 132. In this manner, the control system 150 can obtain real-time access to network resources 122 via network 120. The network resources 122 can be used to obtain processing modules for execution by data processor 171, data content to train internal neural networks, system parameters, or other data.

The ecosystem 101 can include a wide area data network 120. The network 120 represents one or more conventional wide area data networks, such as the Internet, a cellular telephone network, satellite network, pager network, a wireless broadcast network, gaming network, WiFi network, peer-to-peer network, Voice over IP (VoIP) network, etc. One or more of these networks 120 can be used to connect a user or client system with network resources 122, such as websites, servers, central control sites, or the like. The network resources 122 can generate and/or distribute data, which can be received in vehicle 105 via web-enabled devices 130 or user mobile devices 132. The network resources 122 can also host network cloud services, which can support the functionality used to compute or assist in processing image input or image input analysis. Antennas can serve to connect the control system 150 and the multimodal drivable road surface detection module 200 with the data network 120 via cellular, satellite, radio, or other conventional signal reception mechanisms. Such cellular data networks are currently available (e.g., Verizon™, AT&T™, T-Mobile™, etc.). Such satellite-based data or content networks are also currently available (e.g., SiriusXM™, HughesNet™, etc.). The conventional broadcast networks, such as AM/FM radio networks, pager networks, UHF networks, gaming networks, WiFi networks, peer-to-peer networks, Voice over IP (VoIP) networks, and the like are also well-known. Thus, as described in more detail below, the control system 150 and the multimodal drivable road surface detection module 200 can receive web-based data or content via web-enabled device interface 131, which can be used to connect with the web-enabled device receiver 130 and network 120. In this manner, the control system 150 and the multimodal drivable road surface detection module 200 can support a variety of network-connectable devices and systems from within a vehicle 105.

As shown in FIG. 1, the control system 150 and the multimodal drivable road surface detection module 200 can also receive data, image processing or LIDAR data processing control parameters, and training content from user mobile devices 132, which can be located inside or proximately to the vehicle 105. The user mobile devices 132 can represent standard mobile devices, such as cellular phones, smartphones, personal digital assistants (PDA's), MP3 players, tablet computing devices (e.g., iPad™), laptop computers, CD players, and other mobile devices, which can produce, receive, and/or deliver data, image processing control parameters, and content for the control system 150 and the multimodal drivable road surface detection module 200. As shown in FIG. 1, the mobile devices 132 can also be in data communication with the network cloud 120. The mobile devices 132 can source data and content from internal memory components of the mobile devices 132 themselves or from network resources 122 via network 120. Additionally, mobile devices 132 can themselves include a global positioning system (GPS) data receiver, accelerometers, WiFi triangulation, or other geo-location sensors or components in the mobile device, which can be used to determine the real-time geo-location of the user (via the mobile device) at any moment in time. In any case, the control system 150 and the multimodal drivable road surface detection module 200 can receive data from the mobile devices 132, such as those shown in FIG. 1.

Referring still to FIG. 1, the example embodiment of ecosystem 101 can include vehicle operational subsystems 140. For embodiments that are implemented in a vehicle 105, many standard vehicles include operational subsystems, such as electronic control units (ECUs), supporting monitoring/control subsystems for the engine, brakes, transmission, electrical system, emissions system, interior environment, and the like. For example, data signals communicated from the vehicle operational subsystems 140 (e.g., ECUs of the vehicle 105) to the control system 150 via vehicle subsystem interface 141 may include information or vehicle metrics related to the state of one or more of the components or subsystems of the vehicle 105. In particular, the data signals, which can be communicated from the vehicle operational subsystems 140 to a Controller Area Network (CAN) bus of the vehicle 105, can be received and processed by the control system 150 via vehicle subsystem interface 141. Embodiments of the systems and methods described herein can be used with substantially any mechanized system that uses a CAN bus or similar data communications bus as defined herein, including, but not limited to, industrial equipment, boats, trucks, machinery, or automobiles; thus, the term "vehicle" as used herein can include any such mechanized systems. Embodiments of the systems and methods described herein can also be used with any systems employing some form of network data communications; however, such network communications are not required.

Referring still to FIG. 1, the example embodiment of ecosystem 101, and the vehicle operational subsystems 140 therein, can include a variety of vehicle subsystems in support of the operation of vehicle 105. In general, the vehicle 105 may take the form of a car, truck, motorcycle, bus, boat, airplane, helicopter, lawn mower, earth mover, snowmobile, aircraft, recreational vehicle, amusement park vehicle, farm equipment, construction equipment, tram, golf cart, train, and trolley, for example. Other vehicles are possible as well. The vehicle 105 may be configured to operate fully or partially in an autonomous mode. For example, the vehicle 105 may control itself while in the autonomous mode, and may be operable to determine a current state of the vehicle and its environment, determine a predicted behavior of at least one other vehicle in the environment, determine a confidence level that may correspond to a likelihood of the at least one other vehicle to perform the predicted behavior, and control the vehicle 105 based on the determined information. While in autonomous mode, the vehicle 105 may be configured to operate without human interaction.

The vehicle 105 may include various vehicle subsystems such as a vehicle drive subsystem 142, vehicle sensor subsystem 144, vehicle control subsystem 146, and occupant interface subsystem 148. As described above, the vehicle 105 may also include the control system 150, the computing system 170, and the multimodal drivable road surface detection module 200. The vehicle 105 may include more or fewer subsystems and each subsystem could include multiple elements. Further, each of the subsystems and elements of vehicle 105 could be interconnected. Thus, one or more of the described functions of the vehicle 105 may be divided up into additional functional or physical components or combined into fewer functional or physical components. In some further examples, additional functional and physical components may be added to the examples illustrated by FIG. 1.

The vehicle drive subsystem 142 may include components operable to provide powered motion for the vehicle 105. In an example embodiment, the vehicle drive subsystem 142 may include an engine or motor, wheels/tires, a transmission, an electrical subsystem, and a power source. The engine or motor may be any combination of an internal combustion engine, an electric motor, steam engine, fuel cell engine, propane engine, or other types of engines or motors. In some example embodiments, the engine may be configured to convert a power source into mechanical energy. In some example embodiments, the vehicle drive subsystem 142 may include multiple types of engines or motors. For instance, a gas-electric hybrid car could include a gasoline engine and an electric motor. Other examples are possible.

The wheels of the vehicle 105 may be standard tires. The wheels of the vehicle 105 may be configured in various formats, including a unicycle, bicycle, tricycle, or a four-wheel format, such as on a car or a truck, for example. Other wheel geometries are possible, such as those including six or more wheels. Any combination of the wheels of vehicle 105 may be operable to rotate differentially with respect to other wheels. The wheels may represent at least one wheel that is fixedly attached to the transmission and at least one tire coupled to a rim of the wheel that could make contact with the driving surface. The wheels may include a combination of metal and rubber, or another combination of materials. The transmission may include elements that are operable to transmit mechanical power from the engine to the wheels. For this purpose, the transmission could include a gearbox, a clutch, a differential, and drive shafts. The transmission may include other elements as well. The drive shafts may include one or more axles that could be coupled to one or more wheels. The electrical system may include elements that are operable to transfer and control electrical signals in the vehicle 105. These electrical signals can be used to activate lights, servos, electrical motors, and other electrically driven or controlled devices of the vehicle 105. The power source may represent a source of energy that may, in full or in part, power the engine or motor. That is, the engine or motor could be configured to convert the power source into mechanical energy. Examples of power sources include gasoline, diesel, other petroleum-based fuels, propane, other compressed gas-based fuels, ethanol, fuel cell, solar panels, batteries, and other sources of electrical power. The power source could additionally or alternatively include any combination of fuel tanks, batteries, capacitors, or flywheels. The power source may also provide energy for other subsystems of the vehicle 105.

The vehicle sensor subsystem 144 may include a number of sensors configured to sense information or vehicle metrics related to an environment or condition of the vehicle 105. For example, the vehicle sensor subsystem 144 may include an inertial measurement unit (IMU), a Global Positioning System (GPS) transceiver, a Radar unit, a laser range finder/LIDAR unit (or other distance and intensity measuring device), and one or more cameras or image capturing devices. The vehicle sensor subsystem 144 may also include sensors configured to monitor internal systems of the vehicle 105 (e.g., an $O^2$ monitor, a fuel gauge, an engine oil temperature, etc.). Other sensors are possible as well. One or more of the sensors included in the vehicle sensor subsystem 144 may be configured to be actuated separately or collectively in order to modify a position, an orientation, or both, of the one or more sensors.

The IMU may include any combination of sensors (e.g., accelerometers and gyroscopes) configured to sense position and orientation changes of the vehicle 105 based on inertial acceleration. The GPS transceiver may be any sensor configured to estimate a geographic location of the vehicle 105. For this purpose, the GPS transceiver may include a receiver/transmitter operable to provide information regarding the position of the vehicle 105 with respect to the Earth. The Radar unit may represent a system that utilizes radio signals to sense objects within the local environment of the vehicle 105. In some embodiments, in addition to sensing the objects, the Radar unit may additionally be configured to sense the speed and the heading of the objects proximate to the vehicle 105. The laser range finder or LIDAR unit (or other distance measuring device) may be any sensor configured to sense objects or surfaces in the environment in which the vehicle 105 is located using lasers. In an example embodiment, the laser range finder/LIDAR unit may include one or more laser sources, a laser scanner, and one or more detectors, among other system components. The laser range finder/LIDAR unit could be configured to operate in a coherent (e.g., using heterodyne detection) or an incoherent detection mode. The laser range finder/LIDAR unit is typically configured to produce point clouds representing measured distances at various points in three dimensional (3D) space in front of or adjacent to a vehicle on which the laser range finder/LIDAR unit is mounted. The cameras or image capturing devices may include one or more devices configured to capture a plurality of images of the environment of the vehicle 105. The cameras may be still image cameras or motion video cameras. In a particular embodiment, the LIDAR device can be a 64-line Velodyne™ LIDAR that is operated at a speed of 20 cycles per second. Concurrently, the camera or other image capture device can use a shutter speed of 20 frames per second (fps). Thus, the LIDAR provides a set of sparse cloud points every 1/20 second, and the camera captures an image frame every 1/20 second.

The vehicle control system 146 may be configured to control operation of the vehicle 105 and its components. Accordingly, the vehicle control system 146 may include various elements such as a steering unit, a throttle, a brake unit, a navigation unit, and an autonomous control unit. The steering unit may represent any combination of mechanisms that may be operable to adjust the heading of vehicle 105. The throttle may be configured to control, for instance, the operating speed of the engine and, in turn, control the speed of the vehicle 105. The brake unit can include any combination of mechanisms configured to decelerate the vehicle 105. The brake unit can use friction to slow the wheels in a standard manner. In other embodiments, the brake unit may convert the kinetic energy of the wheels to electric current. The brake unit may take other forms as well. The navigation unit may be any system configured to determine a driving path or route for the vehicle 105. The navigation unit may additionally be configured to update the driving path dynamically while the vehicle 105 is in operation. In some embodiments, the navigation unit may be configured to incorporate data from the multimodal drivable road surface detection module 200, the GPS transceiver, and one or more predetermined maps so as to determine the driving path for the vehicle 105. The autonomous control unit may represent a control system configured to identify, evaluate, and avoid or otherwise negotiate potential obstacles in the environment of the vehicle 105. In general, the autonomous control unit may be configured to control the vehicle 105 for operation without a driver or to provide driver assistance in controlling the vehicle 105. In some embodiments, the autonomous control unit may be configured to incorporate data from the multimodal drivable road surface detection module 200, the GPS transceiver, the Radar, the LIDAR, the cameras, and other vehicle subsystems to determine the driving path or trajectory for the vehicle 105. The vehicle control system 146 may additionally or alternatively include components other than those shown and described.

Occupant interface subsystems 148 may be configured to allow interaction between the vehicle 105 and external sensors, other vehicles, other computer systems, and/or an occupant or user of vehicle 105. For example, the occupant interface subsystems 148 may include standard visual display devices (e.g., plasma displays, liquid crystal displays (LCDs), touchscreen displays, heads-up displays, or the like), speakers or other audio output devices, microphones or other audio input devices, navigation interfaces, and interfaces for controlling the internal environment (e.g., temperature, fan, etc.) of the vehicle 105.

In an example embodiment, the occupant interface subsystems 148 may provide, for instance, means for a user/occupant of the vehicle 105 to interact with the other vehicle subsystems. The visual display devices may provide information to a user of the vehicle 105. The user interface devices can also be operable to accept input from the user via a touchscreen. The touchscreen may be configured to sense at least one of a position and a movement of a user's finger via capacitive sensing, resistance sensing, or a surface acoustic wave process, among other possibilities. The touchscreen may be capable of sensing finger movement in a direction parallel or planar to the touchscreen surface, in a direction normal to the touchscreen surface, or both, and may also be capable of sensing a level of pressure applied to the touchscreen surface. The touchscreen may be formed of one or more translucent or transparent insulating layers and one or more translucent or transparent conducting layers. The touchscreen may take other forms as well.

In other instances, the occupant interface subsystems 148 may provide means for the vehicle 105 to communicate with devices within its environment. The microphone may be configured to receive audio (e.g., a voice command or other audio input) from a user of the vehicle 105. Similarly, the speakers may be configured to output audio to a user of the vehicle 105. In one example embodiment, the occupant interface subsystems 148 may be configured to wirelessly communicate with one or more devices directly or via a communication network. For example, a wireless communication system could use 3G cellular communication, such as CDMA, EVDO, GSM/GPRS, or 4G cellular communication, such as WiMAX or LTE. Alternatively, the wireless communication system may communicate with a wireless local area network (WLAN), for example, using WIFI®. In some embodiments, the wireless communication system 146 may communicate directly with a device, for example, using an infrared link, BLUETOOTH®, or ZIGBEE®. Other wireless protocols, such as various vehicular communication systems, are possible within the context of the disclosure. For example, the wireless communication system may include one or more dedicated short range communications (DSRC) devices that may include public or private data communications between vehicles and/or roadside stations.

Many or all of the functions of the vehicle 105 can be controlled by the computing system 170. The computing system 170 may include at least one data processor 171 (which can include at least one microprocessor) that executes processing instructions stored in a non-transitory computer readable medium, such as the data storage device 172. The computing system 170 may also represent a plurality of computing devices that may serve to control individual components or subsystems of the vehicle 105 in a distributed fashion. In some embodiments, the data storage device 172 may contain processing instructions (e.g., program logic) executable by the data processor 171 to perform various functions of the vehicle 105, including those described herein in connection with the drawings. The data storage device 172 may contain additional instructions as well, including instructions to transmit data to, receive data from, interact with, or control one or more of the vehicle drive subsystem 142, the vehicle sensor subsystem 144, the vehicle control subsystem 146, and the occupant interface subsystems 148.

In addition to the processing instructions, the data storage device 172 may store data such as image processing parameters, machine learning training data, image data, LIDAR point cloud data, drivable road surface information, roadway maps, and path information, among other information. Such information may be used by the vehicle 105 and the computing system 170 during the operation of the vehicle 105 in the autonomous, semi-autonomous, and/or manual modes.

The vehicle 105 may include a user interface for providing information to or receiving input from a user or occupant of the vehicle 105. The user interface may control or enable control of the content and the layout of interactive images that may be displayed on a display device. Further, the user interface may include one or more input/output devices within the set of occupant interface subsystems 148, such as the display device, the speakers, the microphones, or a wireless communication system.

The computing system 170 may control the function of the vehicle 105 based on inputs received from various vehicle subsystems (e.g., the vehicle drive subsystem 142, the vehicle sensor subsystem 144, and the vehicle control subsystem 146), as well as from the occupant interface subsystem 148. For example, the computing system 170 may use input from the vehicle control system 146 in order to control the steering unit to avoid an obstacle detected by the vehicle sensor subsystem 144 and the multimodal drivable road surface detection module 200. In an example embodiment, the computing system 170 can be operable to provide control over many aspects of the vehicle 105 and its subsystems.

Although FIG. 1 shows various components of vehicle 105, e.g., vehicle subsystems 140, computing system 170, data storage device 172, control system 150, and multimodal drivable road surface detection module 200, as being integrated into the vehicle 105, one or more of these components could be mounted or associated separately from the vehicle 105. For example, data storage device 172 could, in part or in full, exist separately from the vehicle 105. Thus, the vehicle 105 could be provided in the form of device elements that may be located separately or together. The device elements that make up vehicle 105 could be communicatively coupled together in a wired or wireless fashion. In various example embodiments, the control system 150 and the multimodal drivable road surface detection module 200 in data communication therewith can be implemented as integrated components or as separate components. In an example embodiment, the software components of the control system 150 and/or the multimodal drivable road surface detection module 200 can be dynamically upgraded, modified, and/or augmented by use of the data connection with the mobile devices 132 and/or the network resources 122 via network 120. The control system 150 can periodically query a mobile device 132 or a network resource 122 for updates or updates can be pushed to the control system 150.

In an example embodiment, the multimodal drivable road surface detection module 200 can be configured to include an interface with the control system 150, as shown in FIG. 1, through which the multimodal drivable road surface detection module 200 can send and receive data as described herein. Additionally, the multimodal drivable road surface detection module 200 can be configured to include an interface with the control system 150 and/or other ecosystem 101 subsystems through which the multimodal drivable road surface detection module 200 can receive ancillary data from the various data sources described above. The ancillary data can be used to augment, modify, or train the operation of the multimodal drivable road surface detection module 200 based on a variety of factors including, the context in which the user is operating the vehicle (e.g., the location of the vehicle, the specified destination, direction of travel, speed, the time of day, the status of the vehicle, etc.), and a variety of other data obtainable from the variety of sources, local and remote, as described herein. As described above, the multimodal drivable road surface detection module 200 can also be implemented in systems and platforms that are not deployed in a vehicle and not necessarily used in or with a vehicle.

System and Method for Drivable Road Surface Representation Generation Using Multimodal Sensor Data A system and method for drivable road surface representation generation using multimodal sensor data are disclosed herein. The drivable road surface representation generation system of various example embodiments can automatically generate camera-view drivable road region representations based on data from cameras or other image generation devices and data from LIDAR devices. The drivable road region representations can be used to train deep CNNs. As such, the various example embodiments described herein provide an automatic method to generate reliable drivable road ground truth representations for the CNNs. As LIDAR is another form of sensor device that has been widely used on autonomous driving vehicles, the embodiments disclosed herein use camera or image data with LIDAR data as multimodal sensor data, which can be used to combine point clouds with image data to automatically generate a drivable road region representation.

Figure 2:
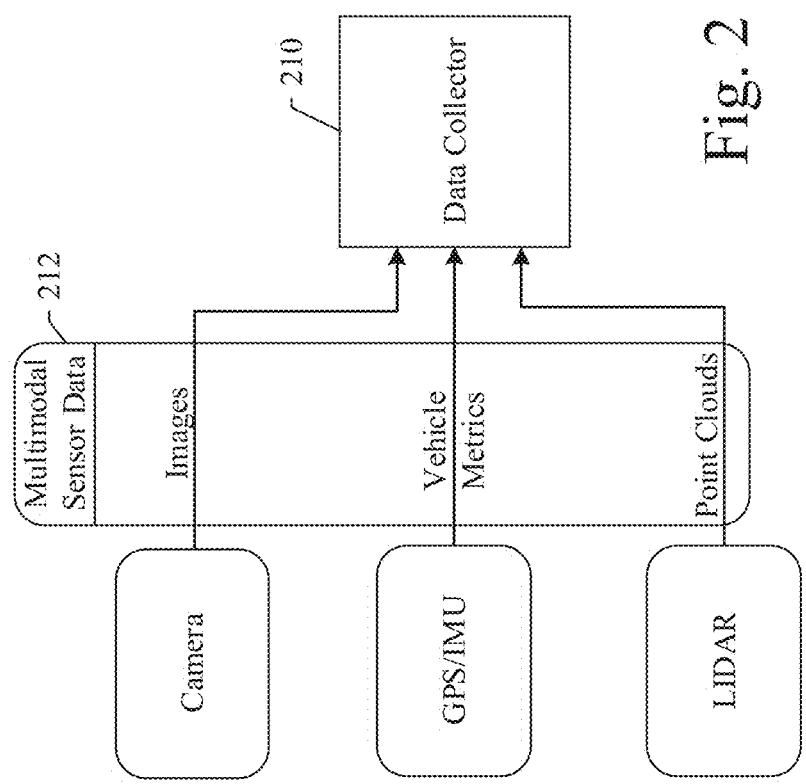
FIGS. 2 and 3 illustrate the components of the multimodal drivable road surface detection module of an example embodiment.
Figure 3:
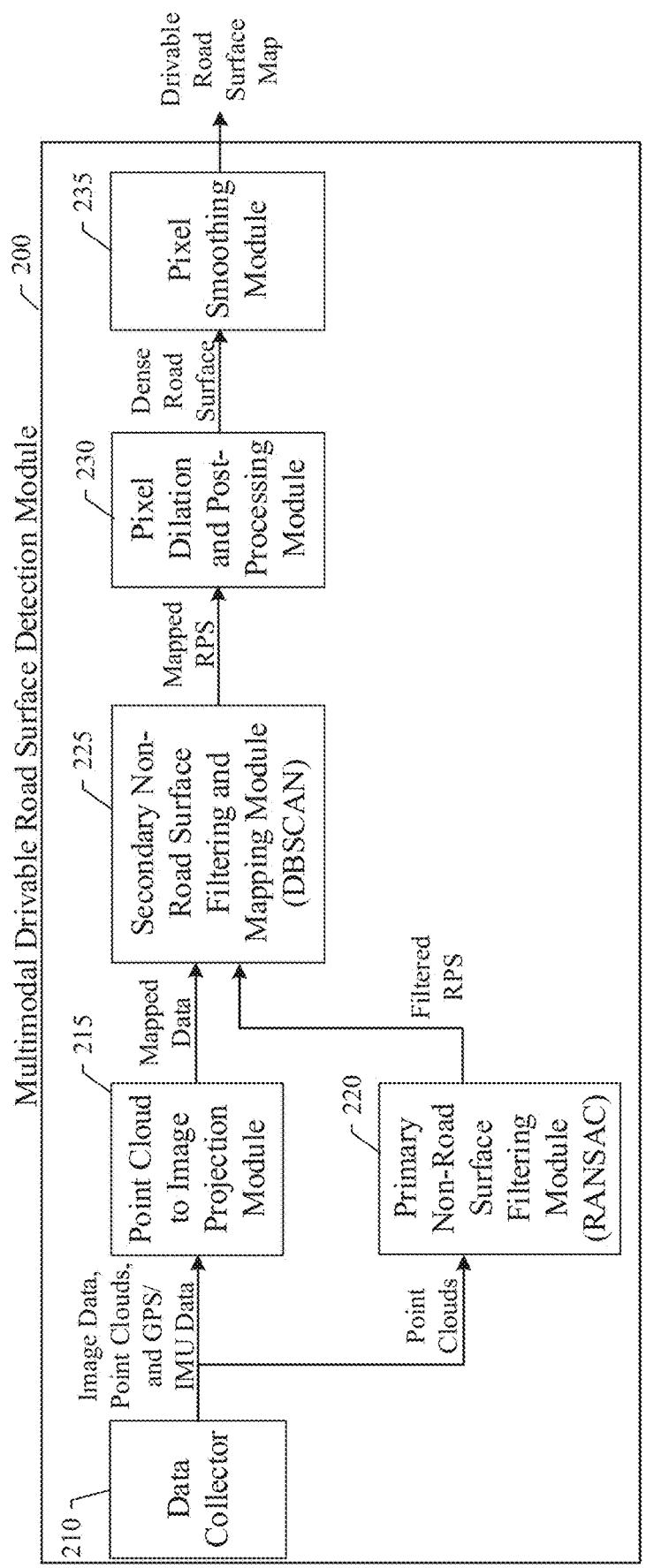

Referring now to FIGS. 2 and 3, the components of an example embodiment are illustrated. The components shown in FIGS. 2 and 3 can be implemented as software modules or components of the control system 150 and/or the multimodal drivable road surface detection module 200. It will be apparent to those of ordinary skill in the art in view of the disclosure herein that the illustrated components can be implemented as integrated components or as separate components. Each of these modules can be implemented as software, firmware, or other logic components executing or activated within an executable environment of the multimodal drivable road surface detection module 200 operating within or in data communication with the control system 150. Each of these modules of an example embodiment is described in more detail below in connection with the figures provided herein.

Referring to FIG. 2, a data collector 210 can be configured to gather multimodal sensor data 212 from a plurality of different types of sensors (e.g., cameras or image capture devices, LIDAR devices, and vehicle sensor subsystems 144, such as the GPS and IMU subsystems). In an example embodiment, the sensor modules, both LIDAR and camera, can be mounted on the top or front of the vehicle 105 while the camera is positioned to face the front of the vehicle. The images or image data and timing data from the cameras can be obtained by the data collector 210 and processed for time and location alignment with the point cloud data received from the LIDAR. The GPS and IMU data received with the vehicle metrics can be used to determine the location, orientation, and speed of the vehicle and thereby enable the correlation and time alignment of the image data with the point cloud data. The image data, point cloud data, and vehicle metrics can be stored in a data storage device of the data collector 210 for use by the other processing modules of the multimodal drivable road surface detection module 200 shown in FIG. 3. The other modules can use the data collector 210 as an input source for the aligned image data, point cloud data, and vehicle metrics. The point cloud data obtained by the data collector 210 from the LIDAR can be retained by the data collector 210, which can register the point cloud data within a time range to a common coordinate space and generate an accumulated LIDAR point cloud representing a collection of aligned point cloud data over time. The data collector 210 can also use the GPS and IMU data to determine the location, orientation, and speed of the vehicle and thereby enable the correlation and time alignment of the accumulated point cloud data. The accumulated and aligned point cloud data can be retained in the data collector 210 for use by the other processing modules of the multimodal drivable road surface detection module 200 shown in FIG. 3. The other modules can use the data collector 210 as an input source for the accumulated and aligned image data and 3D point cloud data.

Figure 4:
FIGS. 4 through 7 illustrate sample images of roadway drivable road surfaces processed by an example embodiment.

FIG. 3 illustrates the other components of the multimodal drivable road surface detection module 200 of an example embodiment. Referring now to FIG. 3, the multimodal drivable road surface detection module 200 can include a point cloud to image projection module 215. The point cloud to image projection module 215 can be configured to perform the processing as described herein. As described above, the data collector 210 provides an input source for the image data, 3D point cloud data, and vehicle metrics. As shown in FIG. 3, the point cloud to image projection module 215 can project the 3D point cloud data onto the 2D image data to produce mapped image/point cloud data. In another example embodiment, the image data and the point cloud data can be transformed to a common coordinate space—the image data in a 2D image space and the point cloud data in a 3D space. In particular, for each image frame, the point cloud to image projection module 215 can map the corresponding 3D point cloud, which contains width, height, and depth information, to the 2D image plane through a coordinate transformation. The projected or mapped data can be provided as an output of the point cloud to image projection module 215. An example of the mapped data in an example embodiment is shown in FIG. 4.

Referring again to FIG. 3, the multimodal drivable road surface detection module 200 can include a primary non-road surface filtering module 220. The primary non-road surface filtering module 220 can be configured to perform the processing as described herein. Because the raw point cloud data scanned from the LIDAR sensor does not contain any categorical or object information, we cannot directly determine which of the points in the point cloud data correspond to the road surface based on raw LIDAR data alone. In order to determine the points in the point cloud data that correspond to the road surface or to remove non-road surface points, the primary non-road surface filtering module 220 can perform a primary filtering operation on the point cloud data. In one example embodiment, the primary filtering operation can be performed using a well-known Random Sample Consensus (RANSAC) process on the raw LIDAR point cloud data. RANSAC is an iterative method to estimate parameters of a mathematical model from a set of observed data that contains outliers, when outliers are to be accorded no influence on the values of the estimates. Therefore, RANSAC also can be interpreted as an outlier detection method. It will be apparent to those of ordinary skill in the art in view of the disclosure herein that in other embodiments, a primary filtering operation other than RANSAC can be equivalently used. In the example embodiment, the drivable road surface is assumed to be a generally flat surface. Thus, points corresponding to this flat surface can be identified initially as road points and retained in a Road Points Set (RPS). Points that do not correspond to this flat road surface can be identified initially as non-road points and either excluded from the RPS or retained in a Non-Road Points Set (NRPS). The points in the NRPS can be initially considered points not on the road surface and associated with other non-drivable areas (e.g., other cars, bridges, obstacles, etc.). Because the points in the NRPS do not correlate to the generally flat road surface, these points can be rejected by RANSAC and excluded from the RPS. After applying the RANSAC process in the example embodiment, the raw LIDAR point cloud data can be split into several datasets. Because the road surface generally contains the highest quantity of LIDAR points, the primary non-road surface filtering module 220 can take the largest set of LIDAR points and define this set as the Road Points Set (RPS). The remaining LIDAR points can be defined as the Non-Road Point Sets (NRPS). As shown in FIG. 3, the filtered RPS can be provided as an output from the primary non-road surface filtering module 220.

Referring again to FIG. 3, the multimodal drivable road surface detection module 200 can include a secondary non-road surface filtering and mapping module 225. The secondary non-road surface filtering and mapping module 225 can be configured to perform the processing as described herein. After applying the RANSAC process as described above, there may still be some non-road points remaining in the filtered RPS. This can be caused by noise, LIDAR calibration problems, lighting or surface irregularities, incorrect estimations by the LIDAR sensor (e.g., extreme far points, small curbs, etc.), or other anomalies. To further distill and secondarily filter the LIDAR points in the initially filtered RPS, the secondary non-road surface filtering and mapping module 225 can apply a secondary filtering operation. In an example embodiment, a well-known DBSCAN process can be used. Density-based spatial clustering of applications with noise (DBSCAN) is a data clustering algorithm proposed by Martin Ester, Hans-Peter Kriegel, Jorg Sander and Xiaowei Xu in 1996. DBSCAN is a density-based clustering algorithm. For example, given a set of points in some space, DBSCAN groups together points that are closely packed together (e.g., points with many nearby neighbors) and marking as outliers points that lie alone in low-density regions (e.g., whose nearest neighbors are too far away). In the example embodiment, the DBSCAN process is a powerful clustering technique based on sample density. In particular, isolated points in the filtered RPS that do not belong to any cluster can be moved from the RPS to the NRPS. In other words, the isolated points or outliers in the filtered RPS can be removed from the RPS. It will be apparent to those of ordinary skill in the art in view of the disclosure herein that in other embodiments, a secondary filtering or clustering operation other than DBSCAN can be equivalently used. As a result of the primary and secondary filtering operations as described above, the remaining points in the RPS can be considered likely points on the road surface.

Figure 5:

As described above, the point cloud to image projection module 215 can project the 3D point cloud data onto the 2D image data to produce mapped image/point cloud data. Given the remaining points in the RPS that can be considered likely points on the road surface, the secondary non-road surface filtering and mapping module 225 can map the remaining points in the RPS to the corresponding pixels in the related image. As a result, the secondary non-road surface filtering and mapping module 225 can produce a mapped RPS and corresponding image pixels. As shown in FIG. 3, the mapped RPS can be provided as an output from the secondary non-road surface filtering and mapping module 225. An example of a sample image corresponding to the mapped RPS is shown in FIG. 5. As shown in FIG. 5, the primary and secondary filtering operations performed by an example embodiment as described above have effectively removed the non-road surface points and corresponding image pixels from the sample image of FIG. 5.

Referring again to FIG. 3, the multimodal drivable road surface detection module 200 can include a pixel dilation and post-processing module 230. The pixel dilation and post-processing module 230 can be configured to perform the processing as described herein. The pixel dilation and post-processing module 230 can receive the mapped RPS and corresponding image pixels produced by secondary non-road surface filtering and mapping module 225 as described above. As shown in the examples of FIGS. 4 and 5, LIDAR point clouds are sparse. To produce a dense pixel-level road surface representation from the sparse point cloud points, the pixel dilation and post-processing module 230 can first perform a dilation operation, which adds every adjacent pixel corresponding to a current point cloud point (e.g., within 10 pixels in the x direction) in the RPS to the RPS. As a result, the adjacent pixels corresponding to point cloud points in the RPS blend together in a more coherent representation of the drivable road surface.

Figure 6:
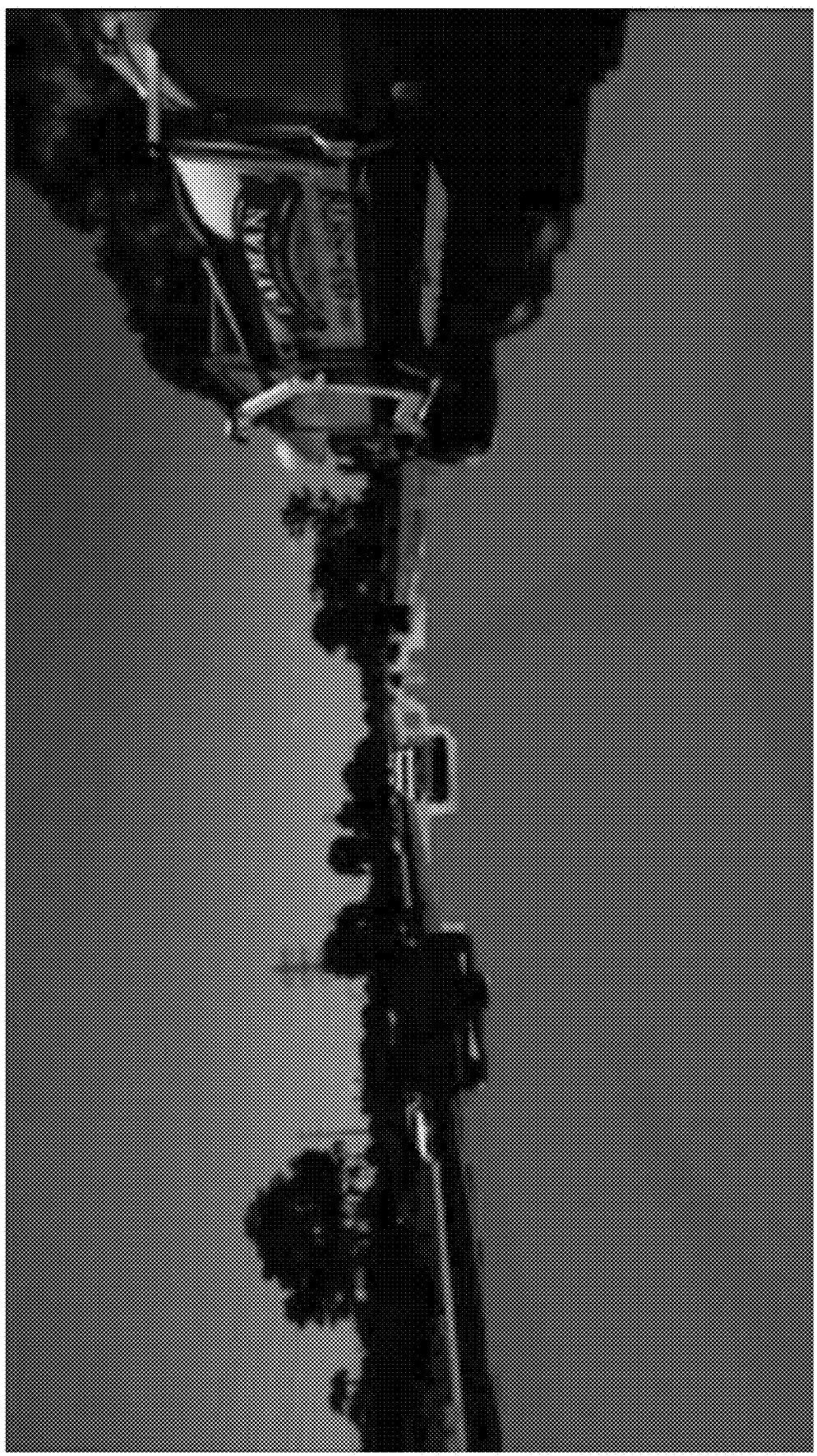

Because there may still exist some false negative road surface pixels after the dilation operation due to the sparse nature of the cloud points, the pixel dilation and post-processing module 230 can then perform post-processing operations by making two assumptions: 1) All pixels positioned straight below drivable pixels (i.e., drivable pixels are those included in the drivable road surface representation as described above) are drivable pixels. A pixel positioned below a drivable pixel means a pixel positioned between the drivable pixel and the vehicle or camera position; and 2) Pixels in areas around non-drivable pixels are non-drivable pixels. Based on the first assumption (assumption 1) set forth above, the pixel dilation and post-processing module 230 can add all pixels below a pixel corresponding to a current point cloud point in the RPS to the RPS. Based on the second assumption (assumption 2) set forth above, the pixel dilation and post-processing module 230 can add every adjacent pixel (e.g., within 25 pixels of both x and y direction) corresponding to every point in the NRPS to the NRPS. This operation, in effect, removes adjacent non-road surface pixels from the RPS. These post processing operations can ensure that the pixel dilation and post-processing module 230 can produce a maximum set of drivable points in the RPS while minimizing the false positives, which may occur with obstacles, such as vehicles. As shown in FIG. 3, the dense road surface representation produced by the pixel dilation and post-processing module 230 can be provided as an output from the pixel dilation and post-processing module 230. An example of the resulting dense road surface representation is shown in FIG. 6.

Figure 7:
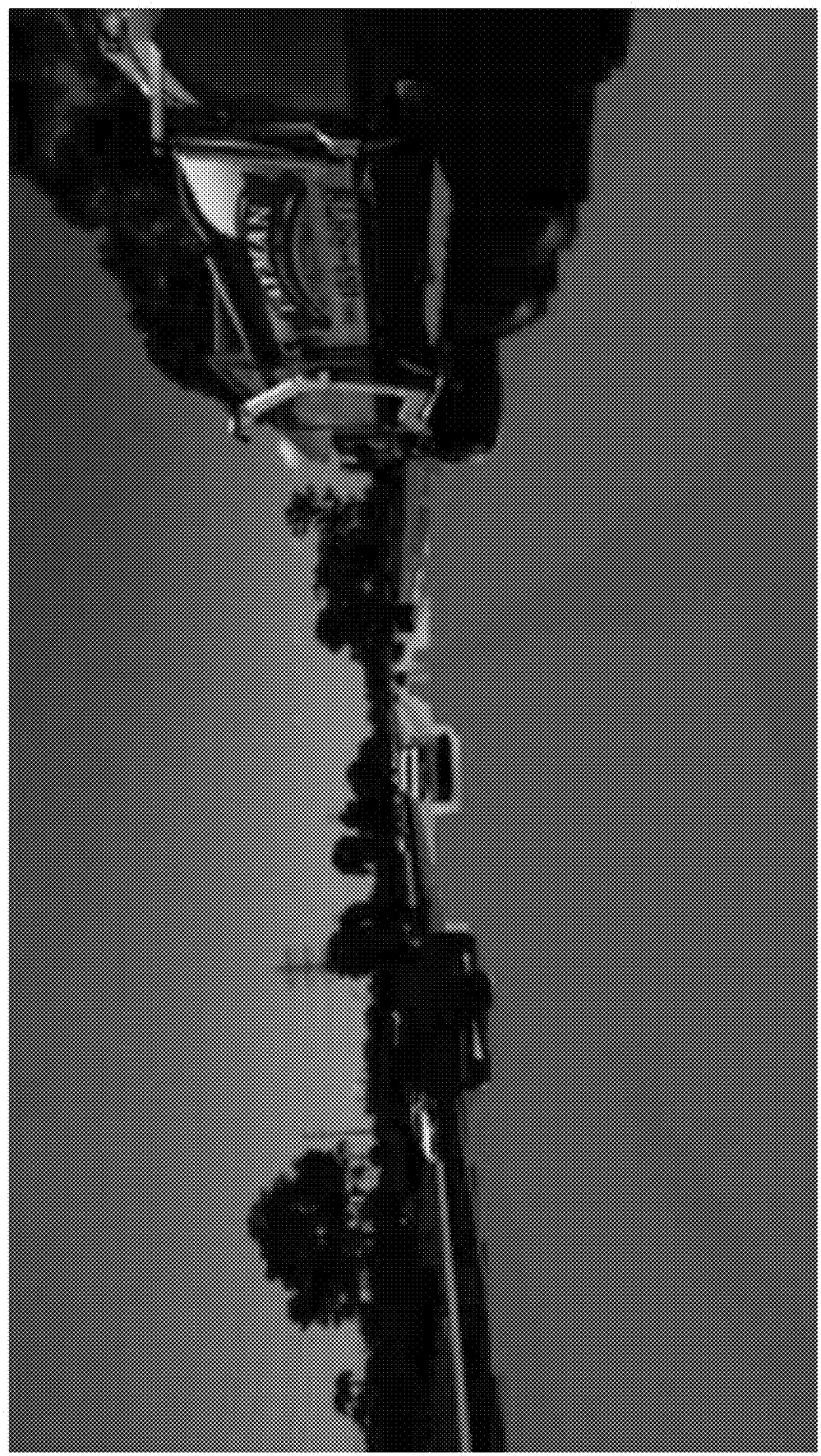

Referring again to FIG. 3, the multimodal drivable road surface detection module 200 can include a pixel smoothing module 235. The pixel smoothing module 235 can be configured to perform the processing as described herein. To further obtain a ground truth representation for the drivable road surface, prior domain knowledge can be taken into consideration. In an example embodiment, the pixel smoothing module 235 can perform processing operations corresponding to two additional assumptions: 1) The drivable road surface must be smooth; and 2) The drivable road surface must be continuous, that is, there should not be two or more discrete drivable areas, such as the road from the opposite direction, or the road beyond an obstacle. The pixel smoothing module 235 of the example embodiment can perform the processing operations corresponding to the first assumption (assumption 1) set forth above by applying a Gaussian smoothing filter to the dense road surface representation obtained from the pixel dilation and post-processing module 230 as described above. The pixel smoothing module 235 of the example embodiment can perform the processing operations corresponding to the second assumption (assumption 2) set forth above by identifying the connected components of the road surface area represented in the camera image frames and only keeping the largest contiguous road surface area representation as the drivable road surface representation. These smoothing operations can effectively reduce the noise caused by either the LIDAR or the previous processing steps. For example, some false positive areas can be produced by portions of the image data that represent the sky or roadways in the opposite direction of travel. The processing performed by the modules of the multimodal drivable road surface detection module 200 as described above can eliminate or minimize these false positive areas. As shown in FIG. 3, the drivable road surface map or representation produced by the pixel smoothing module 235 can be provided as an output from the multimodal drivable road surface detection module 200. An example of the drivable road surface map or representation produced by the multimodal drivable road surface detection module 200 is shown in FIG. 7.

As described herein, the multimodal drivable road surface detection module 200 of the example embodiments can produce a drivable road surface map that can be used to distinguish drivable areas of a roadway from non-drivable areas. Once the drivable road surfaces in the input images and point cloud data are identified and represented, particular inferences can be determined from the presence and location of the drivable road surfaces and appropriate vehicle control actions can be initiated. Additionally, deep CNNs can be trained using the drivable road surface map and the ground truth information the map represents as generated by the example embodiments.

Figure 8:
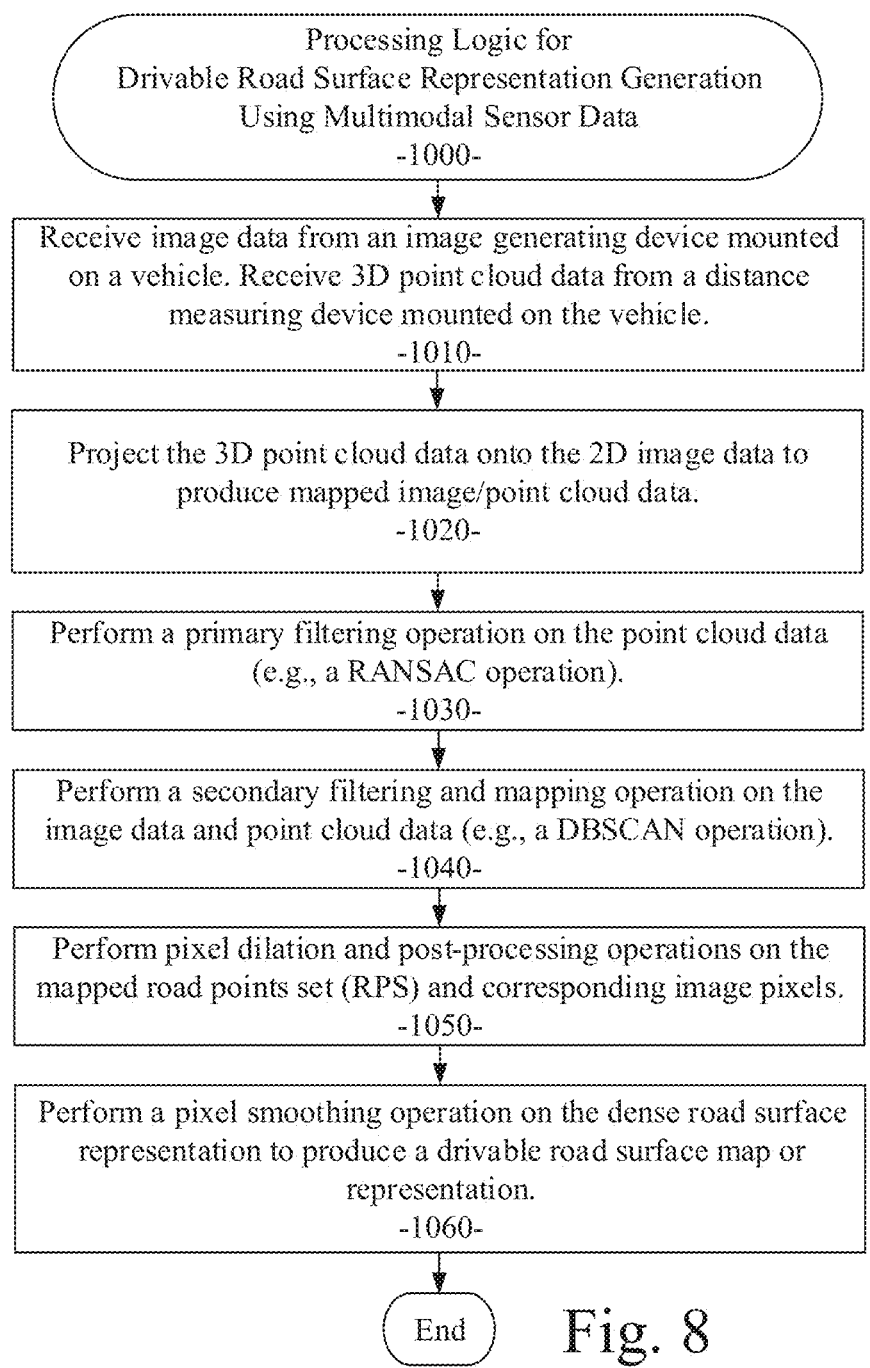
FIGS. 8 and 9 are process flow diagrams illustrating example embodiments of a system and method for drivable road surface representation generation using multimodal sensor data.

Referring now to FIG. 8, a flow diagram illustrates an example embodiment of a system and method 1000 for using multimodal sensor data for drivable road surface detection and representation. The example embodiment can be configured to: receive image data from an image generating device mounted on a vehicle and to receive 3D point cloud data from a distance measuring device mounted on the vehicle (processing block 1010); project the 3D point cloud data onto the 2D image data to produce mapped image/point cloud data (processing block 1020); perform a primary filtering operation on the point cloud data (e.g., a RANSAC operation) (processing block 1030); perform a secondary filtering and mapping operation on the image data and point cloud data (e.g., a DBSCAN operation) (processing block 1040); perform pixel dilation and post-processing operations on the mapped road points set (RPS) and corresponding image pixels (processing block 1050); and perform a pixel smoothing operation on the dense road surface representation to produce a drivable road surface map or representation (processing block 1060).

Figure 9:
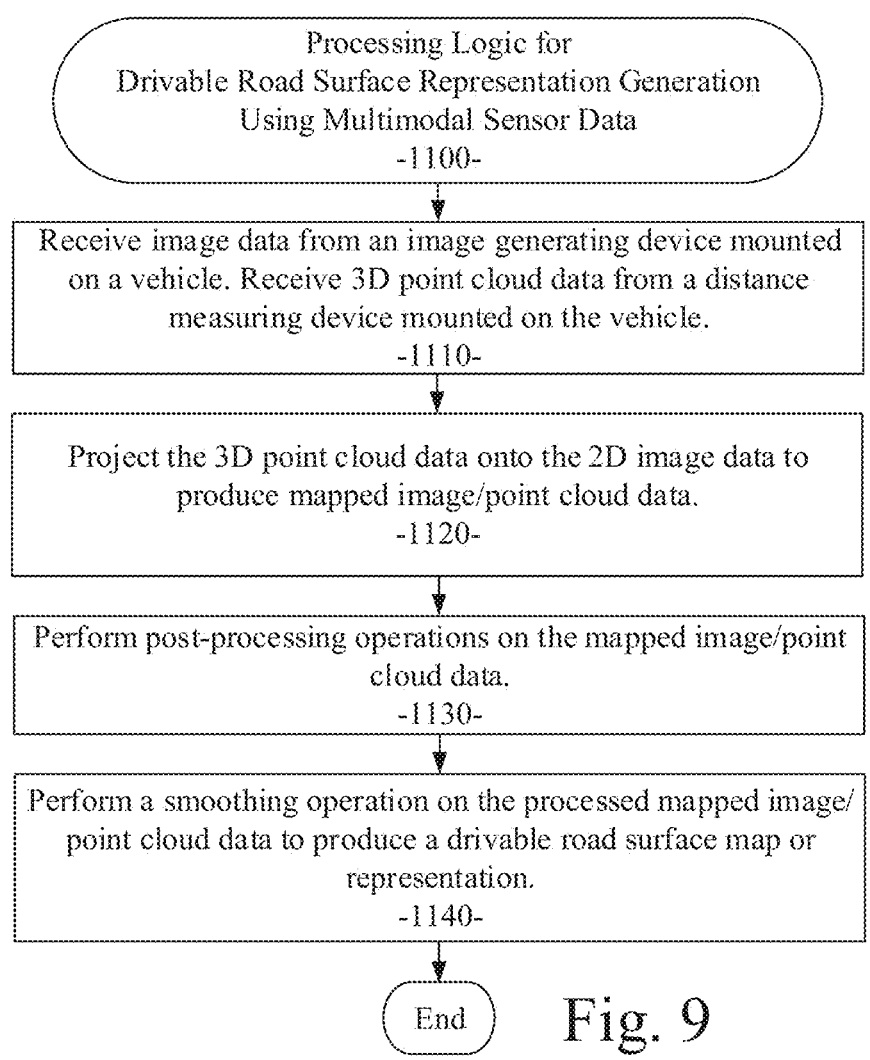

Referring now to FIG. 9, a flow diagram illustrates an example embodiment of a system and method 1100 for using multimodal sensor data for drivable road surface detection and representation. The example embodiment can be configured to: receive image data from an image generating device mounted on a vehicle and to receive 3D point cloud data from a distance measuring device mounted on the vehicle (processing block 1110); project the 3D point cloud data onto the 2D image data to produce mapped image/point cloud data (processing block 1120); perform post-processing operations on the mapped image/point cloud data (processing block 1130); and perform a smoothing operation on the processed mapped image/point cloud data to produce a drivable road surface map or representation (processing block 1140).

As used herein and unless specified otherwise, the term "mobile device" includes any computing or communications device that can communicate with the control system 150 and/or the multimodal drivable road surface detection module 200 described herein to obtain read or write access to data signals, messages, or content communicated via any mode of data communications. In many cases, the mobile device 130 is a handheld, portable device, such as a smart phone, mobile phone, cellular telephone, tablet computer, laptop computer, display pager, radio frequency (RF) device, infrared (IR) device, global positioning device (GPS), Personal Digital Assistants (PDA), handheld computers, wearable computer, portable game console, other mobile communication and/or computing device, or an integrated device combining one or more of the preceding devices, and the like. Additionally, the mobile device 130 can be a computing device, personal computer (PC), multiprocessor system, microprocessor-based or programmable consumer electronic device, network PC, diagnostics equipment, a system operated by a vehicle 119 manufacturer or service technician, and the like, and is not limited to portable devices. The mobile device 130 can receive and process data in any of a variety of data formats. The data format may include or be configured to operate with any programming format, protocol, or language including, but not limited to, JavaScript, C++, iOS, Android, etc.

As used herein and unless specified otherwise, the term "network resource" includes any device, system, or service that can communicate with the control system 150 and/or the multimodal drivable road surface detection module 200 described herein to obtain read or write access to data signals, messages, or content communicated via any mode of inter-process or networked data communications. In many cases, the network resource 122 is a data network accessible computing platform, including client or server computers, websites, mobile devices, peer-to-peer (P2P) network nodes, and the like. Additionally, the network resource 122 can be a web appliance, a network router, switch, bridge, gateway, diagnostics equipment, a system operated by a vehicle 119 manufacturer or service technician, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein. The network resources 122 may include any of a variety of providers or processors of network transportable digital content. Typically, the file format that is employed is Extensible Markup Language (XML), however, the various embodiments are not so limited, and other file formats may be used. For example, data formats other than Hypertext Markup Language (HTML)/XML or formats other than open/standard data formats can be supported by various embodiments. Any electronic file format, such as Portable Document Format (PDF), audio (e.g., Motion Picture Experts Group Audio Layer 3-MP3, and the like), video (e.g., MP4, and the like), and any proprietary interchange format defined by specific content sites can be supported by the various embodiments described herein.

The wide area data network 120 (also denoted the network cloud) used with the network resources 122 can be configured to couple one computing or communication device with another computing or communication device. The network may be enabled to employ any form of computer readable data or media for communicating information from one electronic device to another. The network 120 can include the Internet in addition to other wide area networks (WANs), cellular telephone networks, metro-area networks, local area networks (LANs), other packet-switched networks, circuit-switched networks, direct data connections, such as through a universal serial bus (USB) or Ethernet port, other forms of computer-readable media, or any combination thereof. The network 120 can include the Internet in addition to other wide area networks (WANs), cellular telephone networks, satellite networks, over-the-air broadcast networks, AM/FM radio networks, pager networks, UHF networks, other broadcast networks, gaming networks, WiFi networks, peer-to-peer networks, Voice Over IP (VoIP) networks, metro-area networks, local area networks (LANs), other packet-switched networks, circuit-switched networks, direct data connections, such as through a universal serial bus (USB) or Ethernet port, other forms of computer-readable media, or any combination thereof. On an interconnected set of networks, including those based on differing architectures and protocols, a router or gateway can act as a link between networks, enabling messages to be sent between computing devices on different networks. Also, communication links within networks can typically include twisted wire pair cabling, USB, Firewire, Ethernet, or coaxial cable, while communication links between networks may utilize analog or digital telephone lines, full or fractional dedicated digital lines including T1, T2, T3, and T4, Integrated Services Digital Networks (ISDNs), Digital User Lines (DSLs), wireless links including satellite links, cellular telephone links, or other communication links known to those of ordinary skill in the art. Furthermore, remote computers and other related electronic devices can be remotely connected to the network via a modem and temporary telephone link.

The network 120 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. The network may also include an autonomous system of terminals, gateways, routers, and the like connected by wireless radio links or wireless transceivers. These connectors may be configured to move freely and randomly and organize themselves arbitrarily, such that the topology of the network may change rapidly. The network 120 may further employ one or more of a plurality of standard wireless and/or cellular protocols or access technologies including those set forth herein in connection with network interface 712 and network 714 described in the figures herewith.

In a particular embodiment, a mobile device 132 and/or a network resource 122 may act as a client device enabling a user to access and use the control system 150 and/or the multimodal drivable road surface detection module 200 to interact with one or more components of a vehicle subsystem. These client devices 132 or 122 may include virtually any computing device that is configured to send and receive information over a network, such as network 120 as described herein. Such client devices may include mobile devices, such as cellular telephones, smart phones, tablet computers, display pagers, radio frequency (RF) devices, infrared (IR) devices, global positioning devices (GPS), Personal Digital Assistants (PDAs), handheld computers, wearable computers, game consoles, integrated devices combining one or more of the preceding devices, and the like. The client devices may also include other computing devices, such as personal computers (PCs), multiprocessor systems, microprocessor-based or programmable consumer electronics, network PC's, and the like. As such, client devices may range widely in terms of capabilities and features. For example, a client device configured as a cell phone may have a numeric keypad and a few lines of monochrome LCD display on which only text may be displayed. In another example, a web-enabled client device may have a touch sensitive screen, a stylus, and a color LCD display screen in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript™, EXtensible HTML (xHTML), Compact HTML (CHTML), and the like, to display and send a message with relevant information.

The client devices may also include at least one client application that is configured to receive content or messages from another computing device via a network transmission. The client application may include a capability to provide and receive textual content, graphical content, video content, audio content, alerts, messages, notifications, and the like. Moreover, the client devices may be further configured to communicate and/or receive a message, such as through a Short Message Service (SMS), direct messaging (e.g., Twitter), email, Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between another computing device, and the like. The client devices may also include a wireless application device on which a client application is configured to enable a user of the device to send and receive information to/from network resources wirelessly via the network.

The control system 150 and/or the multimodal drivable road surface detection module 200 can be implemented using systems that enhance the security of the execution environment, thereby improving security and reducing the possibility that the control system 150 and/or the multimodal drivable road surface detection module 200 and the related services could be compromised by viruses or malware. For example, the control system 150 and/or the multimodal drivable road surface detection module 200 can be implemented using a Trusted Execution Environment, which can ensure that sensitive data is stored, processed, and communicated in a secure way.

Figure 10:
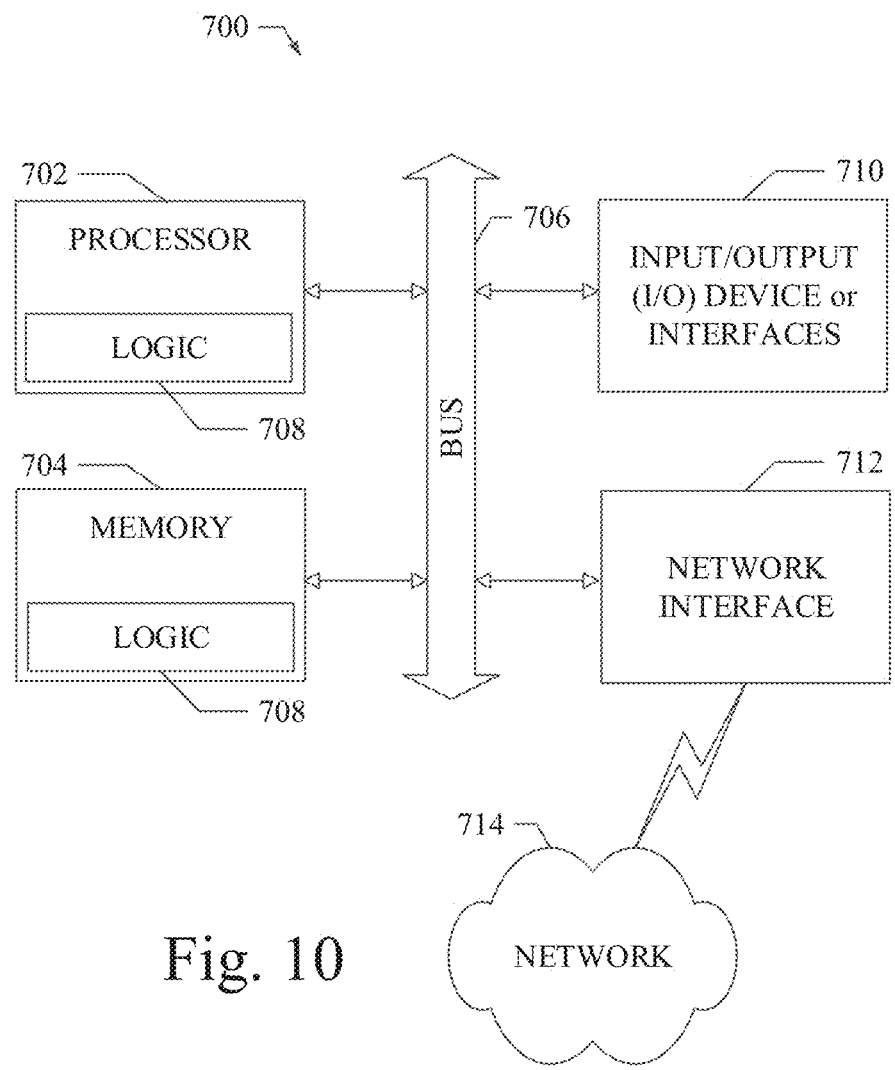
FIG. 10 shows a diagrammatic representation of machine in the example form of a computer system within which a set of instructions when executed may cause the machine to perform any one or more of the methodologies discussed herein.

FIG. 10 shows a diagrammatic representation of a machine in the example form of a computing system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example computing system 700 can include a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display, an audio jack, a voice interface, and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth©, IEEE 802.11x, and the like. In essence, network interface 712 may include or support virtually any wired and/or wireless communication and data processing mechanisms by which information/data may travel between a computing system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:
   a data processor; and
   a multimodal drivable road surface detection module, executable by the data processor, the multimodal drivable road surface detection module being configured to perform a multimodal drivable road surface detection operation configured to:
      receive image data from an image generating device mounted on a vehicle and to receive three dimensional (3D) point cloud data from a distance measuring device mounted on the vehicle;
      project the 3D point cloud data onto the 2D image data to produce mapped image and point cloud data;
      perform post-processing operations on the mapped image and point cloud data, the post-processing operations being configured to perform an outlier detection process to remove outlier points of the point cloud data that do not correspond to a flat road surface captured in the image data, the post-processing operations being further configured to perform a density-based spatial clustering process to remove outlier points of the point cloud data that do not correspond to a point cluster; and
      perform a smoothing operation on the processed mapped image and point cloud data to produce a drivable road surface map or representation.

2. The system of claim 1 being configured to perform a primary filtering operation on the 3D point cloud data using a Random Sample Consensus (RANSAC) operation.

3. The system of claim 1 being configured to perform a secondary filtering and mapping operation on the image data and the 3D point cloud data using a density-based spatial clustering of applications with noise (DBSCAN) operation.

4. The system of claim 1 being configured to perform pixel dilation and post-processing operations on the mapped image and point cloud data.

5. The system of claim 1 being configured to use the drivable road surface map or representation to train a deep convolutional neural network (CNN).

6. The system of claim 1 wherein the image generating device is one or more cameras.

7. The system of claim 1 wherein the distance measuring device is one or more laser light detection and ranging (LIDAR) devices.

8. The system of claim 1 being further configured to output the drivable road surface map to a vehicle control subsystem of the vehicle.

9. A method comprising:
   receiving image data from an image generating device mounted on a vehicle and receiving three dimensional (3D) point cloud data from a distance measuring device mounted on the vehicle;
   projecting the 3D point cloud data onto the 2D image data to produce mapped image and point cloud data;
   performing post-processing operations on the mapped image and point cloud data, the post-processing operations including performing an outlier detection process to remove outlier points of the point cloud data that do not correspond to a flat road surface captured in the image data, the post-processing operations including performing a density-based spatial clustering process to remove outlier points of the point cloud data that do not correspond to a point cluster; and
   performing a smoothing operation on the processed mapped image and point cloud data to produce a drivable road surface map or representation.

10. The method of claim 9 including performing a primary filtering operation on the 3D point cloud data using a Random Sample Consensus (RANSAC) operation.

11. The method of claim 9 including performing a secondary filtering and mapping operation on the image data and the 3D point cloud data using a density-based spatial clustering of applications with noise (DBSCAN) operation.

12. The method of claim 9 including performing pixel dilation and post-processing operations on the mapped image and point cloud data.

13. The method of claim 9 including using the drivable road surface map or representation to train a deep convolutional neural network (CNN).

14. The method of claim 9 wherein the image generating device is one or more cameras.

15. The method of claim 9 wherein the distance measuring device is one or more laser light detection and ranging (LIDAR) devices.

16. The method of claim 9 including outputting the drivable road surface map to a vehicle control subsystem of the vehicle.

17. A non-transitory machine-useable storage medium embodying instructions which, when executed by a machine, cause the machine to:

receive image data from an image generating device mounted on a vehicle and to receive three dimensional (3D) point cloud data from a distance measuring device mounted on the vehicle;

project the 3D point cloud data onto the 2D image data to produce mapped image and point cloud data;

perform post-processing operations on the mapped image and point cloud data, the post-processing operations being configured to perform an outlier detection process to remove outlier points of the point cloud data that do not correspond to a flat road surface captured in the image data, the post-processing operations being further configured to perform a density-based spatial clustering process to remove outlier points of the point cloud data that do not correspond to a point cluster; and perform a smoothing operation on the processed mapped image and point cloud data to produce a drivable road surface map or representation.

18. The non-transitory machine-useable storage medium of claim 17 being configured to perform a primary filtering operation on the 3D point cloud data using a Random Sample Consensus (RANSAC) operation.

19. The non-transitory machine-useable storage medium of claim 17 being configured to perform a secondary filtering and mapping operation on the image data and the 3D point cloud data using a density-based spatial clustering of applications with noise (DBSCAN) operation.

20. The non-transitory machine-useable storage medium of claim 17 being configured to perform pixel dilation and post-processing operations on the mapped image and point cloud data.

* * * * *